Dec. 5, 1967
C. G. HOUSER
3,356,669
COMPOUNDS POLYMERIZATION
Filed April 1, 1964
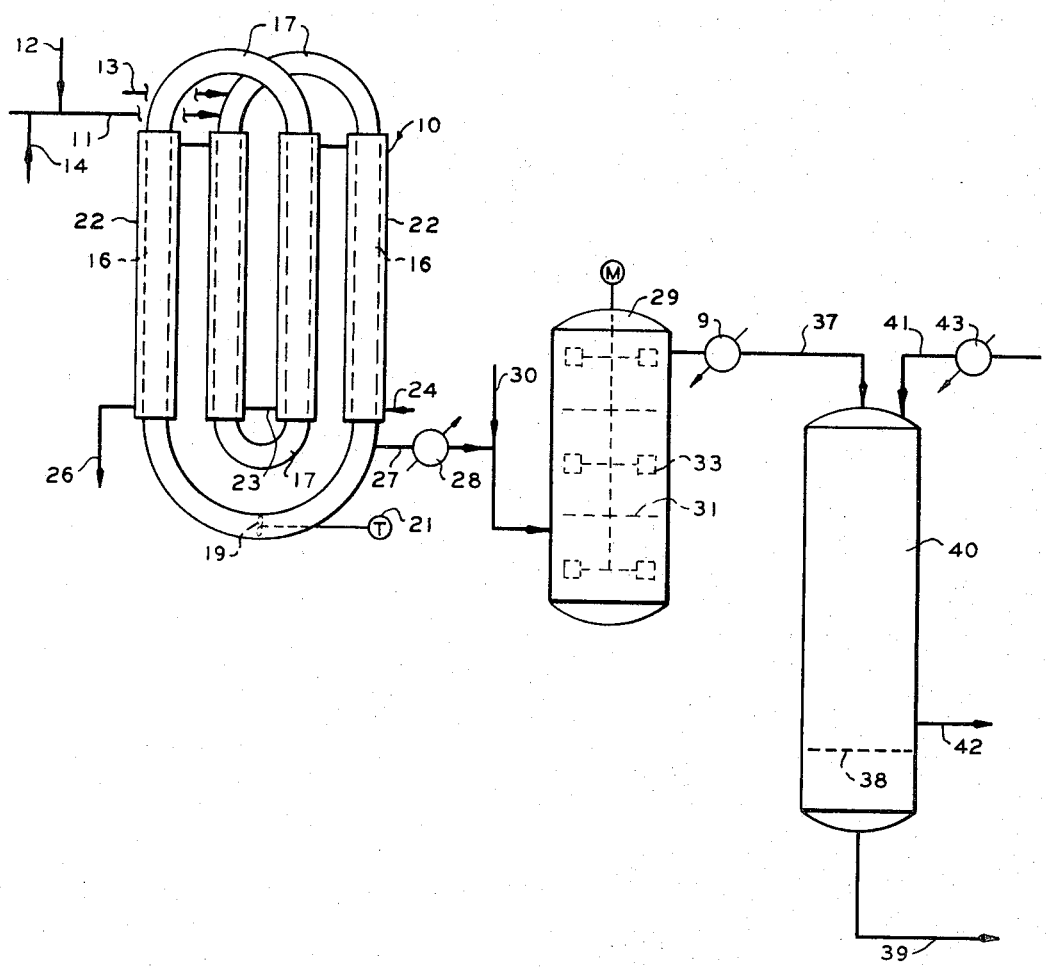
INVENTOR.
C.G. HOUSER
BY *Young & Quigg*
ATTORNEYS United States Patent Office 3,356,669
Patented Dec. 5, 1967

3,356,669
COMPOUNDS POLYMERIZATION
Clarence G. Houser, Bartlesville, Okla., assignor to Phillips Petroleum Company, a corporation of Delaware
Filed Apr. 1, 1964, Ser. No. 356,505
8 Claims. (Cl. 260—93.7)

ABSTRACT OF THE DISCLOSURE

Solid 1-olefin polymers are treated with a wash solution comprising propylene or mixtures thereof with a light hydrocarbon having a progressively declining temperature so as to remove catalyst residues and soluble polymers therefrom.

---

This invention relates to the treatment of polymeric compounds. More specifically, this invention relates to an improved method for the removal of catalyst residues and soluble polymers in the effluent from a polymerization reaction zone. In one aspect this invention relates to an improved method for washing polymeric compositions so as to avoid high concentrations of soluble polymer in the wash medium. In another aspect this invention relates to a method for washing polymeric compositions so as to avoid an excessive pressure drop in the system.

Various reactions for polymerizing olefins are described in the literature, these polymerizations usually being conducted in the presence of a catalyst. One type of catalyst which has been widely used in the polymerization of monoolefins, particularly of ethylene, consists of an organometal compound, e.g. triethylaluminum, and a compound of a heavy metal, e.g. titanium tetrachloride. When certain olefins, such as propylene, are contacted with such a catalyst, a polymer is obtained which contains greater or lesser amounts of a fraction which is crystalline and which is characterized by a certain regularity of molecular structure. Thus, a polypropyene molecule can be considered as a chain of 2-carbon units with a methyl side group attached to every other carbon unit in the chain. Certain polymers of this type are characterized by the fact that they contain series of such monomer units in which all of the methyl side groups are oriented in space at the same position or at the same angle with respect to the tertiary carbon atoms to which they are attached. The portion of the polymer having this regular structure is highly crystalline and is generally referred to as isotactic polypropylene. It is recognized that this highly crystalline polypropylene is preferred for most practical applications.

A well-known procedure for preparing isotactic polymers of mono-1-olefins, such as propylene, involves the polymerization of propylene with a catalyst system comprising an alkylaluminum compound and titanium trichloride. One of the problems encountered with polymers prepared by such a process concerns the presence of catalyst residues or ash-forming ingredients in the product. The "ash content" of a product refers to the inorganic constituents which are present in the polymer in unidentified form and which produce ash when the polymer is burned. The presence of these catalyst residues in the polymer adversely affects the color and heat stability of the polymer as well as its electrical properties. In one process proposed for the polymerization of mono-1-olefins, the olefin is polymerized in a mass system wherein the propylene is in liquid phase and the polymerization is conducted without the addition of more than small amounts of an inert diluent. In such a process, the only inert diluent present in the polymerization zone is that which may be present in the feed or that which may be used in the introduction of the catalyst.

A number of methods have been proposed for the removal of catalyst residues from polymers prepared by these processes involving the initial separation of the polymer from the diluent or in the mass polymerization of the monomer. In one method, the separated polymer is treated with a washing agent which is usually an alcohol, such as isopropyl alcohol. While this treatment of the polymer with the alcohol is quite effective in reducing ash content, it also introduces an entirely different type of material into the system, necessitating the provision of special equipment for the recovery and purification of the alcohol. In another suitable method for removal of catalyst residues from olefin polymers in a mass polymerization process, the effluent containing solid polymer, catalyst residues and liquid olefin is contacted with a diketone under conditions such that the olefin remains in the liquid phase. The effluent thus treated is then washed with a low-boiling hydrocarbon, preferably the same olefin used in the polymerization, in a countercurrent contacting procedure and under conditions such that the hydrocarbon remains in liquid phase and the solid polymer, having a reduced ash content, is then recovered.

In some of the previously practiced washing techniques difficulty has been experienced due to build-up of high concentrations of soluble polymer in the wash medium. Also, the washing step resulted in an excessive pressure drop in the overall polymerization system due to build-up of an interface in the filter beds.

In accordance with this invention I have now discovered that the problems experienced heretofore relating to washing of the polymeric compositions are avoided when the wash step is carried out in the manner hereinafter described. Specifically, I have now found that by the use of a wash medium having a gradually declining temperature during the wash step, adequate wash of the polymer is achieved without build-up of high concentrations of solubles in the wash medium or excessive pressure drop in the system.

Accordingly, it is an object of this invention to provide an improved process for producing polymers of mono-olefins having a low ash content. Another object of the invention is to provide an improved process for producing polymers of mono-1-olefins having a low content of soluble polymer. Other aspects, objects and the several advantages of the invention will be apparent to those skilled in the art from the accompanying disclosure, the claims, and the drawing, which represents a diagrammatic view of the overall improved process.

The invention is broadly applicable to the recovery of a solid polymer of a 1-olefin in a diluent, said diluent and/or polymer containing catalyst residues. In order to simplify the discussion, the invention will be applied to a specific process for the polymerization of a mono-1-olefin with a catalyst comprising an organometal compound and a metal salt under conditions such that the monomer serves as the diluent and the solid polymer is obtained in particle form. It is to be understood that the invention is applicable to the preparation of a solid polymer in a diluent other than the monomer and with other catalyst systems soluble in an extractant for the polymerization of ethylene homopolymers or copolymers.

Broadly, the improved results of the present invention are obtained by utilizing in a wash zone batch filtration means.

The solid polymers which are treated in accordance with my invention are generally prepared from mono-1-olefins. The invention is broadly applicable to the treatment of polymers of mono-1-olefins having from 2 to 8 carbon atoms per molecule. Examples of such monomers include ethylene, propylene, 1-butene, 1-pentene, 3-methyl-1-butene, and the like. The term "polymers" includes both homopolymers and copolymers of said mono-1-olefins. The invention is particularly applicable to the treatment of isotactic polymers prepared by polymerizing mono-1-olefins containing from 3 to 5 carbon atoms per molecule, with propylene being preferred.

Since a wide variety of catalyst systems can be employed in the polymerization of mono-1-olefins, it is not intended to limit the invention to any particular catalyst system. The invention is applicable to any catalyst system and to any monomer producing a solid polymer containing a catalyst which is soluble in a liquid extractant. Preferred catalyst systems are those suitable for use in the polymerization of mono-1-olefins in a mass polymerization system and under conditions such that a solid polymer in particle form is produced. Among catalyst systems suitable for such use are those broadly defined as organometal and a metal salt. A particularly suitable catalyst is one which comprises (a) a compound having the formula $R_nMX_m$, wherein R is an alkyl, cycloalkyl or aryl radical or combination of these radicals, such as alkaryl, aralkyl, and alkylcycloalkyl, X is hydrogen or a halogen, including chlorine, bromine, iodine and fluorine, M is aluminum, gallium, indium or thallium, $n$ is from 1 to 3, inclusive, $m$ is from 0 to 2, inclusive, and the sum of $m$ and $n$ is equal to the valence of the metal M, and (b) a halide of a metal of Group IV–b, V, VI–b or VIII. The hydrocarbon radicals which can be substituted for R in the aforementioned formula include radicals having up to about 20 carbon atoms each. Radicals having 10 carbon atoms or less are preferred since the resulting catalyst composition has a greater activity for initiating the polymerization.

Examples of compounds corresponding to the formula $R_nMX_m$ which can be employed include trimethylaluminum, triethylaluminum, triisobutylaluminum, tri-n-butylaluminum, tri-n-pentylaluminum, triisooctylaluminum, tri-n-dodecylaluminum, triphenylaluminum, triethylgallium, triphenylgallium, tricyclohexylgallium, tri-n-butylindium, triethylthallium, diethylaluminum hydride, $CH_3AlCl_2$, $(CH_3)_2AlCl$, $C_2H_5AlCl_2$, $(C_2H_5)_2AlCl$ $(C_4H_9)_2AlBr$, $C_8H_{17}AlI_2$, $(C_3H_7)_2GaF$, $(C_6H_{11})_2GaCl$ (cyclohexane derivative), $(C_6H_5)GaBr_2$ (benzene derivative), $C_{20}H_{41}GaBr_2$, $(C_{14}H_{29})_2GaF$, $(C_6H_5)_2InCl$ (benzene derivative), $C_8H_{17}InF_2$, $C_6H_{11})InBr_2$ (cyclohexane derivative), 3-methylcyclohexylaluminum dichloride, 2-cyclohexylethylgallium dichloride, p-tolylberyllium iodide, di-(3-phenyl-1-methylpropyl)indium fluoride, 2-(3-isopropylcyclohexyl)ethylthallium dibromide, and the like.

The metal halide component of the catalyst system is preferably a halide of a Group IV–a metal, i.e., titanium, zirconium, hafnium and germanium. However, it is to be understood that halides of metals of the other groups specified above, such as vanadium, molybdenum, tungsten, cobalt and iron can also be employed in the catalyst system. The trichlorides, trifluorides, tribromides, and triiodides, as well as the tetrachlorides, tetrafluorides, tetrabromides and tetraiodides of the various metals, can be used in the catalyst system either individually or as mixtures of two or more of the metal halides. It is usually preferred to employ a trichloride, such as titanium trichloride in the polymerization.

The preferred catalyst system employed in the polymerization comprises a dialkylaluminum chloride and titanium trichloride, the latter compound preferably being prepared by the reduction of titanium tetrachloride in the presence of aluminum. The reduction product is preferably a complex having the formula $3TiCl_3 \cdot AlCl_3$. The reduction reaction is usually carried out at an elevated temperature, for example at a temperature in the range of 360° to 600° F., preferably from 375° to 450° F.

The amount of catalyst employed in the polymerization can vary over a rather wide range and will depend at least to a certain degree upon the particular catalyst system utilized. However, the determination of the actual amount of catalyst employed in any particular polymerization is well within the skill of the art. In general, the mol ratio of the organometal compound to the metal salt falls within the range of 0.02 to 50 mols. When employing the preferred catalyst system, the mol ratio of the dialkylaluminum halide to the titanium trichloride complex usually ranges from 1.0:0.005 to 1.0:50.0, preferably 1.0:0.1 to 1.0:10.1. The amount of the dialkylaluminum halide used should be at least $1.0 \times 10^{-4}$ gm./gm. of monomer and can be as much as $25 \times 10^{-4}$ gm./gm. of monomer. The amount of titanium trichloride complex used is generally in the range of $1.5 \times 10^{-4}$ to $10 \times 10^{-4}$ gm./gm. of monomer.

Although not essential to the conduct of the polymerization, it is often desirable to carry out the polymerization in the presence of elemental hydrogen. When so operating, hydrogen is added in an amount sufficient to provide from 0.15 to 0.40 mol percent hydrogen in the liquid mono-1-olefin phase in the polymerization zone. By operating in this manner, the productivity of the catalyst is increased and certain properties of the polymer, e.g. flexural modulus, are improved.

Any suitable extractant for the removal or extraction of the catalyst from the solid polymer may be employed within the scope of the invention. As previously mentioned, it is well known that alcohols are suitable for the removal of catalyst systems employing metal salts. Suitable extractants include aliphatic alcohols, carboxylic acids and hydroxy-substituted carboxylic acids, anhydrides of said acids and mixtures thereof. Among these are methanol, ethanol, propanol, butanol, pentanol; acetic, propionic, n-butyric, arachidic, oxalic, malonic, succinic, glutaric, adipic, phenylacetic, hydrocinnamic, maleic and benzoic acids. Preferably the temperature for extraction with these materials is within the range at which the polymer is substantially amorphous but well below the agglomeration point of the polymer, as described and claimed in the copending application of A. A. Harban and J. A. Shotton, Ser. No. 127,650, filed July 28, 1961.

Also well suited as extractants for the method of this invention are the diketones, particularly alpha-diketones and beta-diketones. These diketones can also be defined as being selected from the group consisting of compounds having the formulas (1)
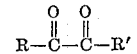

and (2)
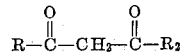

wherein R and R' are hydrocarbon radicals, such as alkyl, cycloalkyl and aryl. Examples of suitable alpha-diketones include the following: 2,3-butanedione, 2,3-pentanedione, 3,4-hexanedione, 4-methyl-2,3-pentanedione, 3,4-heptanedione, 5-methyl-2,3-hexanedione, 2,5-dimethyl-3,4-hexanedione, 2,2,5,5-tetramethyl-3,4-hexanedione, 1,2-cyclopentanedione, 3-methyl-1,2-cyclopentanedione, 1,2-cyclo-4,4′-dimethoxy-benzyl, and the like. The following are examples of suitable beta-diketones: 2,3-pentanedione(acetylacetone), 2,4-hexanedione, 2,4-heptanedione, 5-methyl-2,4-hexanedione, 2,4-octanedione, 5,5-dimethyl-2,4-hexanedione, 3-ethyl-2,4-pentanedione, 3,3-diethyl-2,4-pentanedione, 2,2-dimethyl-3,5-nonanedione, 1-cyclohexyl-1,3-butanedione, 5,5-dimethyl-1,3-cyclohexanedione, 1-phenyl-1,3-butanedione, 1 - (4-biphenylyl)-1,3-butanedione, 1-phenyl-1,3-pentanedione, 1-phenyl-5,5-dimethyl-2,4-hexanedione, 1,3 - diphenyl-1,3 - propanedione, 1,4-diphenyl-1,3-butanedione, 1 - phenyl-2-benzyl-1,3-butanedione, 1-phenyl-3-(2-methoxyphenyl)-1,3-propanedione, 1-(4-nitrophenyl)-1,3-butanedione, 1-(2-furyl)-1,3-butanedione, 1-(tetrahydro-2-furyl)-1,3-butanedione, and the like.

A more comprehensive understanding of the invention can be obtained by referring to the drawing, which is a flow diagram illustrating a preferred embodiment of the invention. While the drawing is described with respect to a process in which propylene is polymerized with a specific catalyst system employing a monomer in liquid phase without the addition of more than small amounts of an inert diluent, it is to be understood that it is not intended to limit the invention to this specific embodiment. The expression "small amounts of an inert diluent" is intended to mean such amounts of diluent as may be introduced into the polymerization zone by way of inert material in the monomer feed and inert diluent employed for use in handling the catalyst components. As employed herein, the term "mass polymerization" designates a polymerization which is conducted with the monomer in liquid phase and without the addition of more than small amounts of an inert diluent.

Referring now to the drawing, as shown, propylene is charged to reactor 10 via line 11. Prior to use in the polymerization, the propylene is treated by conventional methods in order to remove contaminants such as oxygen, $CO_2$, and moisture. It is also usual practice to purge the reactor with an inert gas, such as nitrogen, in order to remove contaminants prior to commencing polymerization. Lines 12 and 13, respectively, provide means for charging the catalyst ingredients, namely the titanium trichloride complex and the diethyl-aluminum chloride, to the system. It is noted that line 12 is connected to line 11 so that the titanium trichloride enters the reactor along with the liquid propylene. As mentioned above, it has been found advantageous to conduct the polymerization in the presence of hydrogen. As shown, the hydrogen enters the propylene feed line via line 14 and is charged to the reactor with the liquid propylene.

The reactor illustrated in the drawing is a loop type reactor comprising two loops, each loop comprised of two straight legs 16 which conveniently can be in the form of elongated pipe sections. The ends of the reactor legs are conveniently interconnected by means of ells 17 so as to provide a continuous flow path through the reactor. The reactor is furnished with an impeller 19 operatively connected to a turbine 21. The operation of the impeller provides motive force for flowing the materials through the loop reactor. The vertical legs of the loop reactor are encompassed by heat exchange jackets 22 which are interconnected by means of lines 23. Line 24, connected to the heat exchange jacket associated with one of the outer legs, provides means for introducing a coolant such as water. The coolant flows through the heat exchange jackets at a temperature and at a rate such that a desired polymerization temperature is maintained in the reactor. The coolant is removed from the reactor system via line 26 which is connected to the other outer leg of the reactor. Although it is often preferred to employ a loop type reactor, it is to be understood that the polymerization can be conducted in any suitable polymerization zone, for example in a closed reaction vessel provided with stirring means.

The conditions employed in conducting the polymerization will vary somewhat depending upon the mono-1-olefin utilized. The polymerization temperature is usually in the range of 0 to 160° F. In the polymerization of ethylene, a temperature ranging from 0 to 45° F. is generally employed. In the case of propylene, the temperature within reactor 10 can vary within the range of 90 to 160° F. When polymerizing a higher olefin, such as 1-butene, a lower polymerization temperature is used, e.g. 86° F. or lower. In the polymerization of olefins containing 5 carbon atoms, still lower temperatures are utilized, e.g. about 75° F. or lower. In general, the polymerization is conducted at a temperature such that solid polymer in particle form is obtained in the polymerization. The actual amount of solid polymer formed is also dependent upon the particular catalyst system used. It has been found that the preferred catalyst system as described above produces a very high percentage of solid polymer with minimum formation of soluble polymer. The pressure employed in reactor 10 is sufficient to maintain the reactants in the liquid phase, e.g. a pressure within the range of 275 to 1000 p.s.i.g. The maximum pressure used is limited only by practical considerations, although generally it is undesirable to exceed a pressure of 2000 p.s.i.g. When polymerizing ethylene, the lower limit of pressure is about 425 p.s.i.g. at a polymerization temperature of about 0° F. In the case of the higher olefins, the lower limit of pressure will be somewhat lower. The pressure desired in reactor 10 can be regulated conveniently by an automatic control means as will be discussed more fully hereinafter. The residence time in reactor 10 can range from about 1 to about 5 hours, with a residence time of about 3 hours being preferred.

The effluent stream recovered from reactor 10 via line 27 comprises solid polymer, catalyst residues, soluble polymer and liquid propylene. The stream usually contains in the range of 25 to 40, preferably 35, weight percent solid polymer. After removal of the effluent via line 27, it is passed through indirect heat exchange means 28 prior to introduction into a lower portion of contact tank 29. Within heat exchange means 28, the effluent is heated to a temperature slightly higher than the temperature employed in reactor 10. Although it is within the scope of the invention in one aspect to introduce the effluent directly into the contact tank without preheating, it has been found that improved results as regard catalyst removal are obtained if the temperature in the contact tank is maintained slightly higher than the polymerization temperature. In the case of propylene, the effluent in line 27 is usually heated to a temperature in the range of 100° to 170° F. In the case of effluents containing higher olefin polymers, a somewhat lower temperature can be used. The pressure in contact tank 29 is sufficient to maintain the propylene in the liquid phase, usually being substantially the same as the pressure within reactor 10. Line 30 provides means for introducing a catalyst removal agent such as propylene oxide, acetylacetone, or both into the contact tank. It is noted that line 30 is connected to line 27 so that the catalyst removal agent enters the contact tank along with the effluent.

Within contact tank 29 the catalyst removal agent such as acetylacetone is thoroughly mixed with the effluent from reactor 10. The contact tank depicted in the drawing comprises an enclosed vessel having baffle members 31 disposed in the upper and lower portions thereof. The baffle members are attached to the walls of the tank, each being provided with a central opening through which the shaft of stirring means 32 passes. The positioning of the baffle members in this manner in effect divides the contact tank into upper, intermediate and lower sections. Each of these sections is provided with a stirrer 33 which is attached to the shaft of stirring means 32. It has been found that particularly good contact is obtained between the acetylacetone and the effluent from reactor 10 when utilizing this specific structure. However, it is to be understood that it is not intended, in this aspect of the invention, to limit the invention to any particular contact tank and that any closed vessel provided with suitable stirring means can be employed.

The catalyst removal agent, e.g. acetylacetone, can be introduced into line 27 alone or as a solution in a hydrocarbon which is inert to the reactants. The amount of treating agent added in this manner can range from 1 to 5 times the stoichiometric equivalent, based on the amount of catalyst present. The contact time within contact tank 29 can vary within rather wide limits, e.g. from 5 minutes to 1 hour. However, it usually is preferred to use a contact time in the range of from 20 to 30 minutes.

As previously mentioned, heat exchanger 28 provides means for heating the effluent from reactor 10 prior to its introduction into contact tank 29. The temperature within tank 29 is maintained by a steam jacket around same.

The treated effluent is withdrawn from the upper portion of contact tank 29 via line 37 and passed, in sequence, into the upper portion of a batch wash-filtration column 40. It is preferred to introduce the effluent into a lower portion of the contact tank and to withdraw the treated effluent from an upper portion of the tank since this method of operation ensures good contact between the solid polymer particles and the acetylacetone.

As shown in the drawing wash tank 40 has provided therein filter medium 38. Line 41 is provided for introducing a wash liquid into the upper portion of the column. Although various light hydrocarbons, particularly paraffinic hydrocarbons containing from 4 to 6 carbon atoms per molecule such as n-pentane, can be employed as the wash liquid, it is preferred to utilize the monomer, e.g. propylene. In addition, because of the improved results attained with propylene, it is not to be implied that the use of propylene is equivalent to the use of a material such as pentane in the wash liquid. It is also within the scope of the invention to employ a mixture of the monomer and a light hydrocarbon as the wash liquid.

In operation, the wash column provides a batch filtration-washing of the effluent from contactor 29. Effluent is introduced into the wash column 40 and collected so as to be washed free of catalyst and soluble polymer. Since the solubility of soluble polymer in propylene increases as temperature decreases, a gradually declining wash temperature generally in the range of about 150 to 0° F., preferably 125 to 50° F., is employed in column 40 by means of the wash medium introduced through conduit 41 so as to dissolve the solubles in the slurry slowly. In this manner the high concentration of solubles generally formed as the cold interface moves through the bed in a cold wash system is avoided. By avoiding the build-up of a viscous zone concentrated in solubles there is avoided the excessively high pressure which would otherwise occur as the viscous zone passed through the filter medium 38. The resulting solid polymer is removed from the filter 38 through conduit 42 and passed through same to a flash chamber not shown. The filtrate is removed by means of conduit 39 for treatment to recover the propylene therefrom.

Thus, effluent from contactor 29 is introduced into column 40 which is provided with line 39 for removal of liquid from the column. The effluent is allowed to continue into column 38 and the solid particles are accumulated within the column, a major portion of the liquid passing from the column through the filter zone 38 and being removed via line 39 from the system for subsequent use.

After column 40 is filled with solids, a stream of propylene is introduced via line 41. Cooler 43 is provided in line 41 so as to apply a gradually diminishing temperature to the wash medium. The resulting liquid containing soluble polymer and catalyst residues is removed through line 39. Various valves and the like, for the sake of simplicity, have been omitted from the accompanying drawing. By employing several wash columns in parallel, continuous operation is achieved. Thus, one column may be filling while another is being washed and a third is being emptied.

The polypropylene product prepared in accordance with the invention has utility in applications where solid plastics are employed. The polymer can be molded to form articles of any desired shape such as bottles and other containers for liquids. Furthermore, the product can be formed into fibers and pipe by extrusion.

A more comprehensive understanding of the invention can be obtained by referring to the following illustrative example, which is not intended, however, to be unduly limitative of the invention.

*Example*

Propylene is polymerized in a mass polymerization in the presence of hydrogen and utilizing a catalyst consisting of diethylaluminum chloride and a titanium trichloride complex. The titanium trichloride complex is prepared by reacting titanium tetrachloride with aluminum, and the complex comprises 4.74 weight per cent aluminum, 25.0 weight percent titanium, and 69.8 weight percent chlorine. The product obtained from the polymerization is thereafter treated in accordance with the invention so as to obtain a polymer product having a very low ash content. The polymerization and the treatment of the polymer are conducted in equipment similar to that shown in the drawing and the details of the process are described hereinafter in conjunction with the drawing.

A purified feed stream of liquid propylene is charged to loop reactor 10 through line 11. The titanium trichloride complex and the diethylaluminum chloride are introduced into the reactor via lines 12 and 13. Hydrogen enters the reactor along with the propylene after being introduced into the propylene feed line via line 14. The loop reactor is operated at a temperature of 130° F. and a pressure of 370 p.s.i.a. The polymerization temperature is maintained at 130° F. by circulating water through the heat exchange jackets with which the loop reactor is provided. The residence time of the reactant materials in the loop reactor is about 3 hours. An effluent stream containing solid polymer in particle form, liquid propylene, catalyst residues and soluble polymer is removed from the loop reactor through line 27. This effluent stream contains about 25 weight percent solid polymer.

The effluent stream recovered from the loop reactor is then passed into contact tank 29. Prior to entering the contact tank, acetylacetone is added to the stream. In the contact tank, the solid polymer is brought into intimate contact with the acetylacetone. The contact tank is operated at a temperature of 130° F. and a pressure of 370 p.s.i.a. The temperature within the contact tank is maintained at 130° F. by a steam jacket surrounding the tank. After a contact time of 30 minutes, the treated effluent stream is passed into wash tower 40. In the wash tower, the treated effluent stream is contacted batchwise with liquid propylene charged to column 40 through line 41. A stream containing liquid propylene, catalyst residues and soluble polymer is removed through line 39. The slurry of solid polymer in liquid propylene is then withdrawn through the wash column 40 via line 42. Where solid dry polymer particles are desired, the polymer can be dried by flashing off the propylene in a flash tank. Solid propylene in particle form recovered from column 40 is thereafter passed to suitable storage facilities. The polypropylene so recovered contains less than 0.1 weight percent ash.

As a typical example, a batch filtration-wash tank is employed with a diameter of 3 feet and a height of 11 feet. A filter capable of retaining the solid polymer and passing liquid is inserted in the bottom of the tank as shown in the figure.

Polymer slurry at 130° F. from contactor 29 is passed into the tank until the latter is full. Such a batch amounts to

| | Pounds |
|---|---|
| Polypropylene | 2000 |
| Propylene | 3800 |
| Soluble polymer | 150 |
| Catalyst residues | 2 |

The batch of polymer is then washed with liquid propylene passed into the wash tank through line 41. The wash propylene is initially passed into the tank at a temperature of 100° F. This temperature is gradually reduced to 60° F. during the passage of 4000 pounds of propylene through the batch of polymer. As the wash temperature is lowered, increasing amounts of soluble polymer are dissolved in the wash without plugging the polymer bed and incurring excessive pressure drop. Total washings (filtrate) removed from the wash column amount to

| | Pounds |
|---|---|
| Propylene | 5800 |
| Soluble polymer | 75 |
| Catalyst residue | 2 |

The 2000 pounds of washed polymer in the column containing 2000 pounds of liquid propylene is passed to polymer recovery steps.

As will be evident to those skilled in the art, many variations and modifications of this invention can be practiced in view of the foregoing disclosure, such variations and modifications believed clearly to come within the spirit and scope of the invention.

I claim:

1. A process for the removal of catalyst and soluble polymer from a slurry of same and a solid polymer of a 1-olefin in a liquid diluent containing catalyst residues therein which comprises introducing said slurry into a liquid separation zone, removing a portion of said liquid diluent, catalyst and soluble polymers from said zone by the continuous addition and removal of a wash medium having a progressively declining temperature and selected from the group consisting of propylene and a mixture of propylene and a light hydrocarbon while retaining said polymer solids within said liquid separation zone and thereafter removing the resulting washed solid polymer from said liquid separation zone.

2. The process for the removal of catalyst and soluble polymer residues from a polymer of a mono-1-olefin from a slurry thereof in a liquid hydrocarbon diluent containing catalyst residues and soluble polymer which comprises introducing said slurry into a liquid separation zone containing a filtering zone at one end thereof, removing a portion of said liquid hydrocarbon diluent catalyst residues and soluble polymer from one end of said separation zone after passing said diluent through said filtering zone, discontinuing the flow of slurry to said separation zone, thereafter introducing a wash liquid selected from the group consisting of propylene and a mixture of propylene and a light hydrocarbon to said separation zone, gradually decreasing the temperature of said liquid while passing same through the resultant bed of polymer solids in said filtering zone and removing said wash liquid from said separation zone, discontinuing the flow of wash liquid thereto, and discharging washed polymer from said zone.

3. The process of claim 2 wherein said wash liquid is the same as the liquid in the slurry and wherein said wash liquid temperature decreases over the range of 150 to 0° F.

4. In a mass polymerization process wherein a liquid mono-1-olefin is contacted with a catalyst capable of polymerizing said olefin under polymerization conditions so as to form solid polymer and wherein an effluent containing said solid polymer, catalyst residues, soluble polymer and liquid olefin is recovered from said polymerization zone and is admixed in a catalyst extraction zone with an extractant for said catalyst residues under conditions such that said olefin remains in the liquid phase, the improvement comprising recovering the thus treated effluent containing solid polymer, liquid olefin, soluble polymer and catalyst residues from said extraction zone, introducing said recovered effluent into a liquid separation zone containing a filtering zone therein whereby a bed of solids is formed by removing a portion of the liquid monoolefin, soluble polymer and catalyst residues from said liquid separation zone, discontinuing the flow of slurry thereto, thereafter introducing a wash liquid selected from the group consisting of propylene and a mixture of propylene and a light hydrocarbon into said filtration zone, said wash liquid being passed through the bed of polymer solids as the temperature of same is progressively reduced and thereafter removed from said liquid separation zone, discontinuing flow of wash liquid thereto, and thereafter recovering a solid polymer substantially free of residues.

5. The process of claim 4 wherein said mono-1-olefin and said wash liquid are propylene.

6. The process of claim 4 wherein said wash liquid is propylene and has a gradually declining temperature within the range of 125 to 50° F.

7. In a mass polymerization process wherein a liquid propylene is contacted with a catalyst capable of polymerizing said propylene under polymerization conditions so as to form solid polymer and wherein an effluent containing solid polymer, soluble polymer, catalyst residues and liquid propylene is recovered from said polymerization zone and is admixed in a catalyst extraction zone with an extractant for said catalyst residues and soluble polymer under conditions such that said propylene remains in the liquid phase, the improvement comprising recovering the thus treated effluent containing solid polymer, soluble polymer, liquid propylene and catalyst residues from said extraction zone, introducing said recovered effluent into a liquid separation zone containing a filtering zone therein whereby a bed of solids is formed, removing a portion of the liquid propylene, soluble polymer, and catalyst residues from said liquid separation zone, discontinuing flow of slurry thereto, thereafter introducing a wash liquid comprising propylene into said filtration zone, said wash liquid being passed down through the bed of polymer solids as the temperature of same is declined gradually over the range of 150 to 0° F. and then removed from said liquid separation zone, discontinuing flow of wash liquid thereto, and thereafter recovering a solid polymer substantially free of residues.

8. A process for treating a solid polymer of propylene so as to remove soluble polymer therefrom which comprises washing same in a wash zone with a wash medium consisting of propylene having a progressively declining temperature by contacting said solid polymers with said wash medium in said zone and continuously removing said wash medium, removing the wash medium from said zone while retaining said polymer solids therein, and thereafter removing the washed polymer from said zone.

References Cited
UNITED STATES PATENTS 3,167,536  6/1965  Zampachova _____ 260—94.9

JOSEPH L. SCHOFER, *Primary Examiner.*

L. EDELMAN, *Assistant Examiner.*